United States Patent [19]

Messina

[11] Patent Number: 5,197,453
[45] Date of Patent: Mar. 30, 1993

[54] TWO-TIER GROOVE CUTTING CIRCULAR SAW BLADE WITH MULTIPLE CORE ASSEMBLY

[75] Inventor: Romolo Messina, Exton, Pa.

[73] Assignee: Sanders Saws, Inc., Honey Brook, Pa.

[21] Appl. No.: 937,635

[22] Filed: Aug. 28, 1992

[51] Int. Cl.⁵ .................... B28D 1/04; E01C 23/09
[52] U.S. Cl. .................... 125/15; 51/206 R; 51/206.5; 76/112; 299/39; 299/89; 404/87
[58] Field of Search .................... 125/15, 18, 22; 51/206 R, 206.4, 206.5; 76/112, 115; 299/38, 39, 79, 89; 404/74, 87, 89, 90, 93, 94

[56] References Cited

U.S. PATENT DOCUMENTS

| | | | |
|---|---|---|---|
| 1,493,379 | 5/1924 | Perry . | |
| 3,162,187 | 12/1964 | Christensen | 76/112 |
| 3,753,430 | 8/1973 | Oas | 125/15 X |
| 3,863,401 | 2/1975 | Schwarzkopf | 125/15 |
| 4,267,814 | 5/1981 | Benson et al. | 125/15 |
| 4,291,667 | 9/1981 | Eichenlaub et al. | 125/15 |
| 4,717,205 | 1/1988 | Sasage | 299/39 |
| 4,930,487 | 6/1990 | Younger | 299/89 |
| 4,982,720 | 1/1991 | Matsuda | 76/115 |

FOREIGN PATENT DOCUMENTS

| | | |
|---|---|---|
| 259124 | 12/1969 | U.S.S.R. . |
| 278721 | 8/1970 | U.S.S.R. . |
| 0574338 | 9/1977 | U.S.S.R. .................... 125/15 |

Primary Examiner—Bruce M. Kisliuk
Assistant Examiner—John A. Marlott
Attorney, Agent, or Firm—Michael R. Swartz; John R. Flanagan

[57] ABSTRACT

A two-tier groove cutting circular saw blade includes a circular middle core having sectors defined about the periphery, a pair of side cores disposed adjacent opposite surfaces of the middle core and having lands defined about their outer peripheries, and pluralities of outer and inner cutting segments are secured to the respective middle core sectors and side core lands. Each side core is smaller in diameter than the middle core such that the side core lands and inner cutting segments secured thereon are displaced radially inwardly from the middle core sectors and outer cutting segments secured thereon, thereby adapting the blade for cutting a narrow lower tier and a wider upper tier of the two-tier groove. The blade also includes core anti-undercut features provided on the middle and side cores at predetermined locations thereon for defining exit paths for flow of material particles generated from the cutting of the groove and flushing of the groove by fluid coolant. The side cores of the blade can be interlocked with the middle core by flanges on their peripheries extending through windows or recesses in the middle core adjacent to the peripheries of the side cores. The blade can also employ spacers between adjacent facing surfaces of the side cores and middle core for positioning the side cores at predetermined spacings from the middle core for presetting the width of the upper tier of the groove.

34 Claims, 6 Drawing Sheets

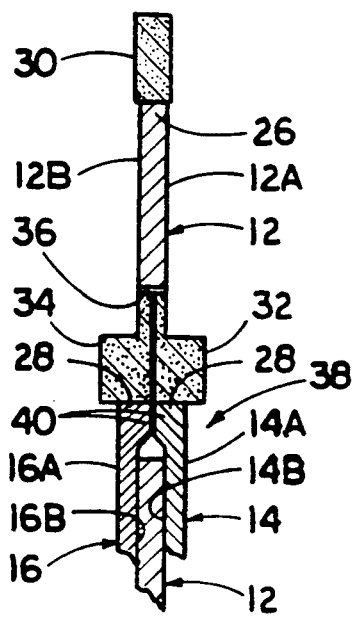
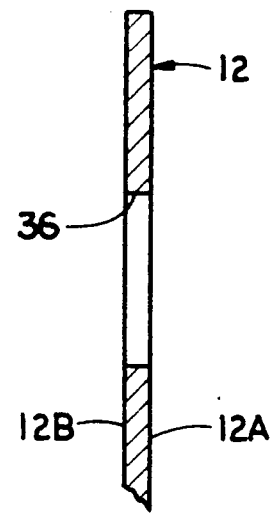
FIG. 8
FIG. 9
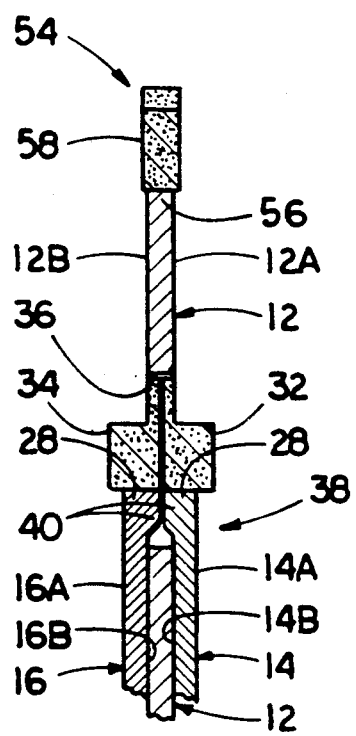
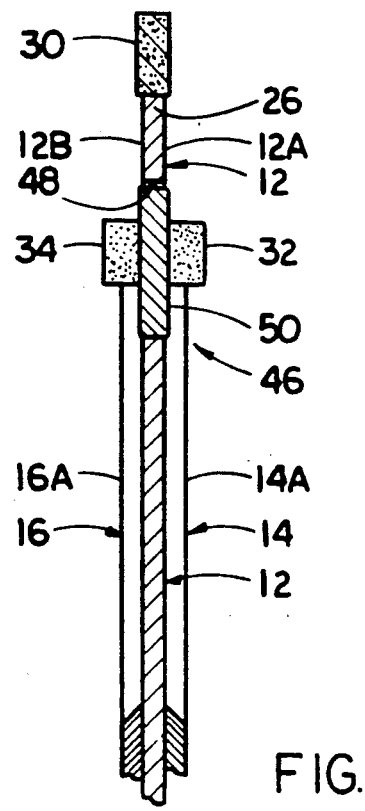
FIG. 10
FIG. 11

TWO-TIER GROOVE CUTTING CIRCULAR SAW BLADE WITH MULTIPLE CORE ASSEMBLY

CROSS-REFERENCE TO RELATED APPLICATION

Reference is hereby made to the following copending U. S. patent application dealing with related subject matter and assigned to the assignee of the present invention: "Two-Tier Groove Cutting Circular Saw Blade With Anti-Undercut Features" by Romolo Messina, assigned U.S. Ser. No. 07/937,638 and filed Aug. 28, 1992.

BACKGROUND OF THE INVENTION

1. Field of the Invention

The present invention generally relates to circular saw blades used to cut a two-tier expansion groove in a concrete surface or the like and, more particularly, is concerned with features incorporated in such blades which reduce wear, increase structural integrity, and prolong useful life of the blades.

2. Description of the Prior Art

It is common practice to cut two-tier grooves in concrete surfaces or the like in order to provide expansion joints therein. The grooves are filled with a compression sealant of neoprene or other similar synthetic rubber-like material which allows the grooves to function as expansion joints in response to temperature-induced expansion or contraction. Until recently the two-tier groove has been made in two cutting passes. In the initial pass, a first narrow groove is cut having the maximum desired depth of the two-tier groove. In the final pass, a second wider groove is cut into the surface superimposed over the first narrower groove but to a lesser depth than the first groove.

More recently, in U.S. Pat. No. 4,930,487 to Younger, a design of a circular saw blade has been proposed for cutting the two-tier groove in a single pass. The saw blade of this patent includes a circular core of uniform thickness having a plurality of outer cutting segments secured to circumferentially spaced support sectors defined about the periphery of the blade core and a plurality of inner cutting segments disposed in openings and secured to support lands defined in the blade core between the periphery and the center of the blade. In order to cut the two-tier groove, it is necessary that the outer cutting segments be wider than the blade core and that the inner cutting segments be wider than both the outer cutting segments and blade core. In one pass of the saw blade, the outer cutting segments will cut the deeper and narrower tier of the groove, whereas the inner cutting segments will cut the shallower and wider tier of the groove above the deeper narrower tier of the groove.

For such applications, it is common practice to continuously flush the cutting area during the cutting operation with a fluid coolant in order to keep the blade as cool as possible. The coolant also serves to flush loose rock-like material, spent abrasive, and the like from the cutting site, all of which in combination with the coolant is generally referred to in the art and throughout the subject application as "swarf".

Although the design of the circular saw blade of the Younger patent represents a step in the right direction toward achieving the cutting of a two-tier expansion groove in a single pass operation, nonetheless there are certain drawbacks with the design. The first drawback is that swarf tends to flow in a path that contacts and causes abrasion and erosion of the blade core in a manner which is commonly referred to as "undercutting". The undercutting occurs at core portions located adjacent to and radially inwardly from where the outer and inner cutting segments are attached to the blade core because the lateral portions of the outer and inner cutting segments extend beyond opposite surfaces of the core and tangentially intersect with the swarf flow path. Such undercutting of the blade core can significantly reduce the life of the blade necessitating its early replacement. The second drawback is that the blade core is of substantially uniform thickness. Given the greater width of the inner cutting segments than the outer cutting segments for cutting the wider upper tier of the groove, there is inadequate structure in the blade core for attaching the inner cutting segments thereto in a way which will withstand the forces imposed on the inner cutting segments during cutting of the upper tier of the groove.

Consequently, a need exists for improvements which will reduce undercutting of the blade core and increase the structural integrity of the blade core so as to allow for the employment of the circular saw blade over a longer normal useful life.

SUMMARY OF THE INVENTION

The present invention provides a circular saw blade designed to satisfy the aforementioned needs. The circular saw blade of the present invention has an overall construction for cutting a two-tier groove in a hard surfaces, such as in concrete or the like. The circular saw blade of the present invention also provides improved resistance to core undercutting and increase the structural integrity of the core so as to thereby prolong the useful life of the blade core and the costly abrasive cutting segments mounted thereto.

Accordingly, the present invention is directed to an circular saw blade for cutting a two-tier groove in a concrete surface or the like. The circular saw blade comprises: (a) a substantially circular middle core having a center, a periphery and a pair of opposite surfaces, the middle core including a plurality of sectors defined in circumferentially spaced relation to one another relative to the center and along the periphery of the middle core; (b) a plurality of outer cutting segments secured to the respective sectors of the middle core, each outer cutting segment having a width greater than the thickness of the middle core between the opposite surfaces thereof such that the outer cutting segments extend beyond the opposite surfaces of the middle core and are operable for cutting a first tier of a groove in a concrete surface; (c) a pair of substantially circular side cores, each side core having a center, a periphery and a pair of opposite surfaces, each side core being disposed adjacent to one of the opposite surfaces of the middle core with the center of each side core coaxially aligned with the center of the middle core, each side core including a plurality of lands defined in circumferentially spaced relation to one another relative to the center and along the periphery of the side core, each side core being smaller in diameter than the middle core such that the lands of the side cores are displaced radially inwardly from the sectors of the middle core; and (d) a plurality of inner cutting segments secured to the respective lands of each side core, each aligned pair of inner cutting segments having a width greater than the width of each outer cutting segment and greater than the thickness of each side core between the opposite surfaces thereof such that the inner cutting segments extend beyond the ones of the opposite surfaces of the side cores that face away from the middle core and are operable for cutting a second tier of the groove in the concrete surface being superimposed on and shallower than the first tier of the groove. Preferably, the side cores of the blade are substantially identical to one another.

The saw blade also includes a plurality of windows defined through the middle core adjacent to and extending radially outwardly from the respective lands of the side cores. The inner cutting segments secured on the lands of the side cores project toward one another into the windows of the middle core. Each aligned pair of inner cutting segments can either be abutting or spaced from one another within the windows of the middle core.

The saw blade further includes means for interlocking the side cores with the middle core at locations about the peripheries of the side cores. The side core interlocking means includes the plurality of windows defined through the middle core adjacent to and extending radially outwardly from the respective lands of the side cores, and a plurality of flanges on the lands of each side core. The flanges on the side cores project from the lands beyond the ones of the opposite surfaces of the side cores that face toward the middle core such that the flanges extend into the windows of the middle core toward one another and are either abutting or spaced from one another within the windows of the middle core. Also, the inner cutting segments which are secured on the lands of the side cores are also secured on the flanges of the side cores and project into the windows of the middle core. The inner cutting segments can either be abutting or spaced from one another within the windows of the middle core.

In a modified embodiment, the side core interlocking means includes a plurality of recesses, instead of the windows, defined in the opposite surfaces of the middle core adjacent to and extending radially outwardly from the respective lands of the side cores, and the plurality of flanges on the lands of the side cores. The flanges project from the lands beyond the ones of the opposite surfaces of the side cores that face toward the middle core such that the flanges extend into the recesses of the middle core toward one another. The inner cutting segments secured on the lands of the side cores are also secured on the flanges of the side cores and project into the recesses of the middle core. The pairs of flanges and pairs of inner cutting segments of the side cores are spaced from one another by the thickness of the middle core between the recesses thereof.

The saw blade still further includes inner means on the middle and side cores at predetermined locations thereon between the center and periphery of the middle core and between preselected ones of the lands of the side cores for defining an exit path away from the inner cutting segments for flow of material particles generated from cutting of the groove and flushing of the groove by fluid coolant so as to reduce wear and undercutting of the core adjacent to the inner cutting segments. The inner means includes a plurality of openings defined in the middle core at the predetermined locations and a plurality of filler segments disposed in the openings and secured to the middle core. The inner means also includes a plurality of cutouts defined in each side core at the predetermined locations thereon between the preselected ones of the lands of the side cores. The openings and filler segments of the middle core and the cutouts of the each side core are less in number than the lands of each side core and the inner cutting segments on each side core. Each filler segment has a width greater than the thickness of the middle core adjacent thereto and less than the width of each inner cutting segment such that the filler segments extend beyond the opposite surfaces of the core through an extent less than that through which the inner cutting segment extends beyond the opposite surfaces of the middle and side cores.

Finally, the saw blade can include spacer means disposed between the adjacent facing surfaces of the side cores and middle core for positioning the side cores at predetermined spacings from the middle core. The spacer means includes a pair of annular disks disposed respectively between the opposite surfaces of the middle core and ones of the surfaces of the side cores facing toward the middle core.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a side elevational view of one embodiment of an improved circular saw blade of the present invention for cutting a two-tier groove in a concrete surface or the like.

FIG. 8 is an enlarged fragmentary sectional view of the blade taken along line 8—8 of FIG. 1.

FIG. 9 is another enlarged fragmentary sectional view of the blade taken along line 9—9 of FIG. 1.

FIG. 10 is still another enlarged fragmentary sectional view of the blade taken along line 10—10 of FIG. 1.

FIG. 11 is yet another enlarged fragmentary sectional view of the blade taken along line 11—11 of FIG. 1.

DETAILED DESCRIPTION OF THE INVENTION

Figure 1:
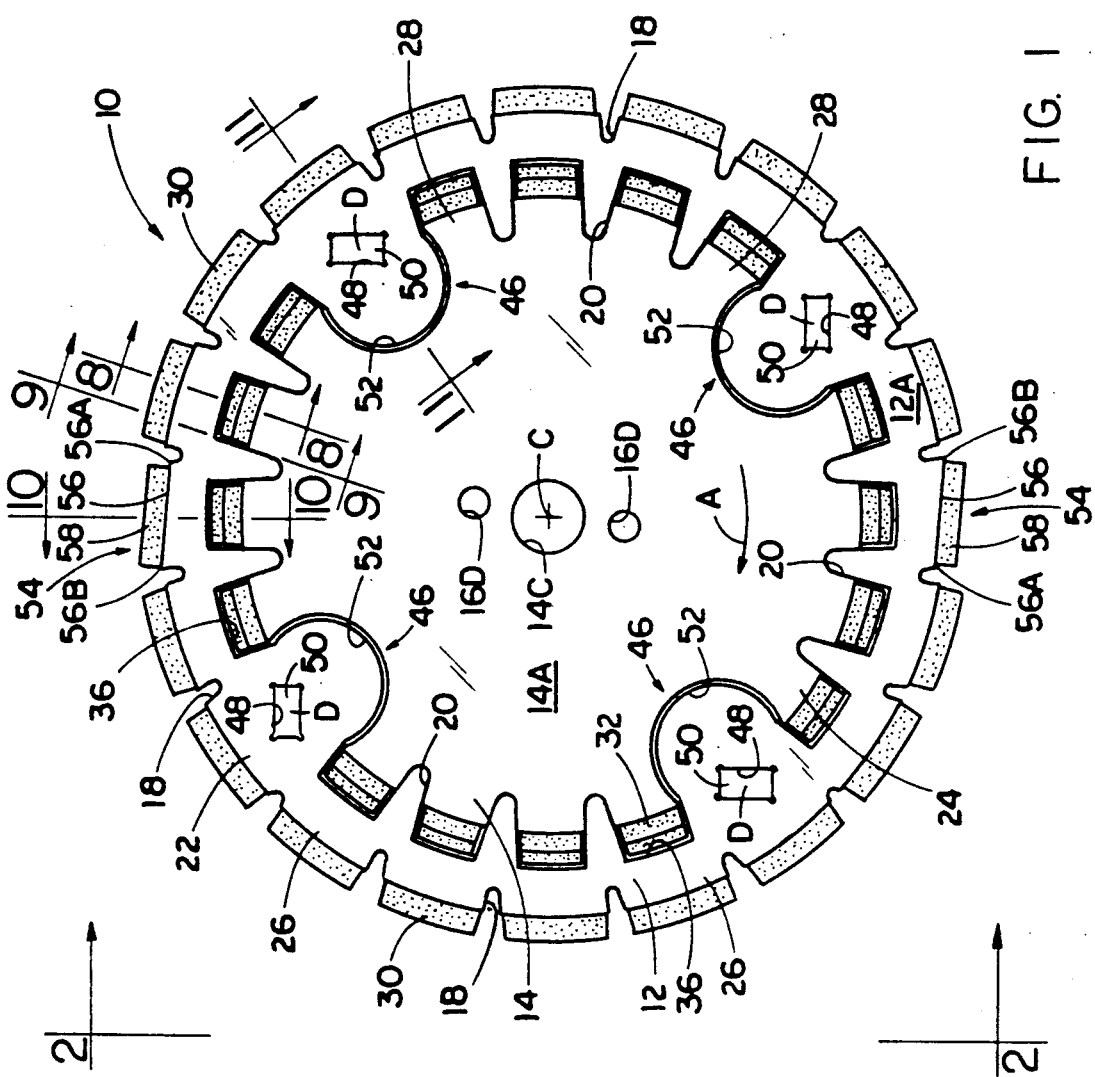

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1-11, there is illustrated one embodiment of a circular saw blade of the present invention, generally designated 10, being adapted particularly for cutting a two-tier groove in a concrete surface or the like. The circular saw blade 10 has a construction which improves its resistance to core undercutting, increases its structural integrity and prolongs its useful life.

The circular saw blade 10 basically includes a substantially circular disk-like middle core 12 and a pair of substantially circular disk-like right and left side cores 14, 16. The middle core 12 has a pair of opposite surfaces 12A, 12B and a central mounting hole 12C defined therethrough concentric with a center C of the blade 10, while the right and left side cores 14, 16 have respective pairs of opposite surfaces 14A, 14B and 16A, 16B and central mounting holes 14C, 16C defined therethrough concentric with the center C of the blade 10. The right and left side cores 14, 16 are respectively disposed adjacent to the right and left opposite surfaces 12A, 12B of the middle core 12 with the central holes 14C, 16C of the side cores 14, 16 coaxially aligned with the central hole 12C of the middle core 12. For sandwiching of the middle core 12 and side cores 14, 16 together, each of the side cores 14, 16 and the middle core 12 are each provided with a pair of securing holes 12D, 14D and 16D respectively. A fastening bolt (not shown) passes through one of the pairs of securing holes 12D, 14D and 16D for assembling together the middle core 12 with the side cores 14, 16 so that the three cores rotate in unison. Preferably, the right and left side cores 14, 16 are identical to one another and interchangeable with one another. Thus, only one of the side cores 14, 16 has been illustrated in FIGS. 5-7.

The middle and side cores 12, 14, 16 of the blade 10, preferably constructed of steel, have circumferentially-spaced radial slots 18, 20 formed therein which open at respective peripheries 22, 24 of the middle and side cores 12, 14, 16 and extend radially inward a short distance toward the center C of the blade 10. The middle core 12 has a plurality of sectors 26 defined between the slots 22 in circumferentially spaced relation to one another relative to the center C of the blade 1 and along the periphery 22 thereof. The right and left side cores 14, 16 have respective pluralities of lands 28 defined between the slots 20 about the peripheries 24 of the side cores 14, 16 and in circumferentially spaced relation to one another relative to the center C of the blade 10. Preferably, the lands 28 of the right and left side cores 14, 16 are radially aligned in pairs with one another and with the sectors 26 of the middle core 12 relative to the center C of the blade 10. The substantially identical side core 14, 16 are smaller in diameter than the middle core 12 such that the lands 28 of the side cores 14, 16 are displaced radially inwardly from the sectors 26 of the middle core 12.

The blade 10 also includes a plurality of outer cutting segments 30 and pluralities of inner cutting segments 32, 34 fabricated of material containing diamond particles. The sectors 26 of the middle core 12 and the lands 28 of the side cores 14, 16 are arcs of circles defined by respective radii of the middle core 12 and side cores 14, 16 rotated about the center C of the blade 10. The outer cutting segments 30, having the same curved shape as the sectors 26, are secured to the sectors 26 in any suitable manner, such as by joints or bonds formed conventionally by soldering or brazing. Each outer cutting segment 30 has a width greater than the thickness between the opposite surfaces 12A, 12B of the middle core 12 such that the outer cutting segment 22 extend laterally beyond the opposite surfaces 12A, 12B of the middle core 12. The outer cutting segments 30 are thus operable for cutting a first tier of the two-tier groove in the concrete surface.

Figure 2:
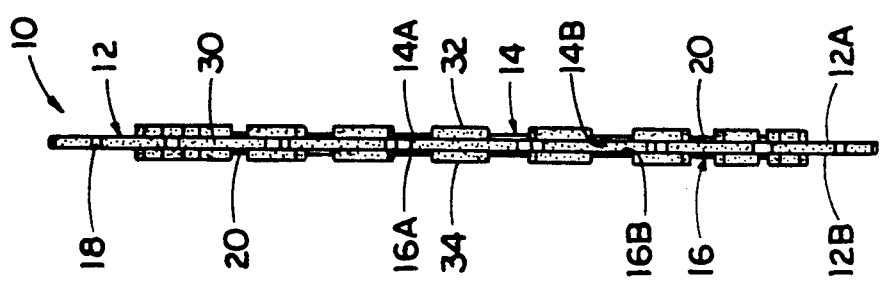
FIG. 2 is an end elevational view of the blade as seen along line 2—2 of FIG. 1.

The pluralities of inner cutting segments 32, 34 on the respective right and left side cores 14, 16 are fabricated of the same material as the outer cutting segments 30 and are secured to the lands 28 of the respective right and left side core 14, 16 in the same manner as the outer cutting segments 30 are secured to the sectors 26. As best seen in FIG. 2, since the lands 28 of the right and left side cores 14, 16 are aligned in pairs with one another, the inner cutting segments 32 on the right side core 14 are aligned and paired with the inner cutting segments 34 on the left side core 16. Further, the paired inner cutting segments 32, 34 on the right and left side cores 14, 16 have identical L-shaped configurations in cross-section. However, the inner cutting segments 32 on the right side core 14 are oriented as mirror images or the reverse of the inner cutting segments 34 on the left side core 16. Each pair of aligned inner cutting segments 32, 34 has a width which is greater than the width of each outer cutting segment 30 and is greater than the thickness between the opposite surfaces 14A, 14B and 16A, 16B of the right and left side cores 14, 16 such that the pluralities of aligned pairs of inner cutting segments 32, 34 taken together extend laterally beyond the opposite surfaces 14A, 16A of the side cores 14, 16 facing away from the middle core 12. The aligned pairs of inner cutting segments 32, 34 are thus operable for cutting a second tier of the groove in the concrete surface which is superimposed on and shallower than the first tier of the groove.

Figure 12:
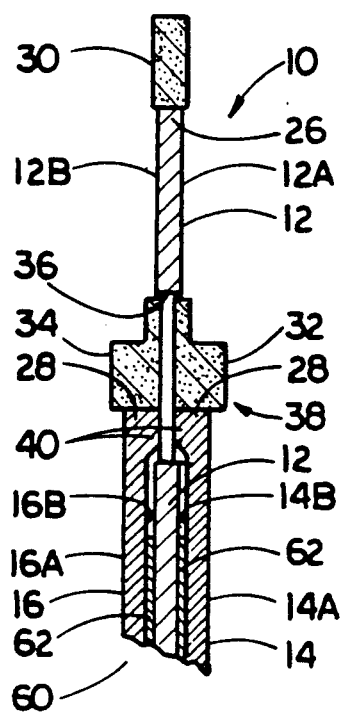
FIG. 12 is an enlarged fragmentary sectional view similar to FIG. 7 but of a modified embodiment of the blade.
Figure 13:
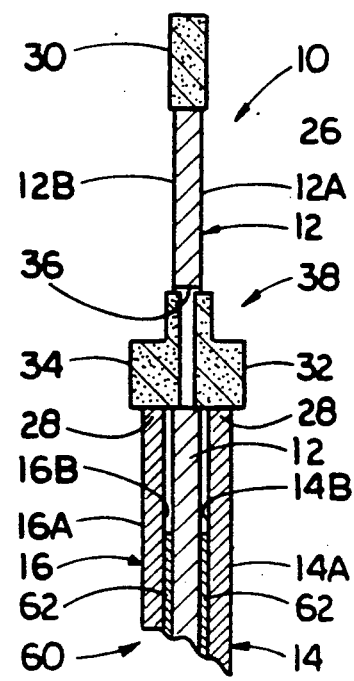
FIG. 13 is an enlarged fragmentary sectional view similar to FIG. 12 but of another modified embodiment of the blade.

In the one embodiment of the circular saw blade 10 of FIGS. 1-11, the middle core 12 has a plurality of windows 36 defined therethrough, such as by being laser cut. The windows 36 of the middle core 12 are aligned adjacent to and extend radially outwardly from the respective aligned pairs of lands 28 of the right and left side cores 14, 16. The aligned pairs of inner cutting segments 32, 34 on the right and left side cores 14, 16 extend toward one another and into one of the windows 36 in the middle core 12. The inner cutting segments 32, 34 can either be abutting one another within the windows 36, as in the one embodiment of the blade 10 shown in FIGS. 8 and 10, or can be spaced from one another within the windows 36 of the middle core 12, as in the modified embodiments of the blade 10 shown in FIGS. 12 and 13.

Further, in the one embodiment as shown in FIGS. 8 and 10, the saw blade 10 includes means 38 for interlocking the right and left side cores 14, 16 with the middle core 12 at locations about the peripheries 24 of the side cores 14, 16. The side core interlocking means 38 includes the plurality of windows 36 defined through the middle core 12 adjacent to and extending radially outwardly from the respective lands 28 of the side cores 14, 16, and a plurality of flanges 40 on the lands 28 of each of the side cores 14, 16. The flanges 40 project from the lands 28 beyond the opposite surfaces 14B, 16B of the side cores 14, 16 that face toward the middle core 12 such that the flanges 40 extend into the windows 36 of the middle core 12 toward one another. The flanges 40 can either be abutting with one another within the windows 36, as in the one embodiment of the blade 10 shown in FIGS. 8 and 10, or can be spaced from one another within the windows 36 of the middle core 12, as in the modified embodiment of the blade 10 shown in FIG. 12.

Also, the inner cutting segments 32, 34 which are secured on the lands 28 of the side cores 14, 16 and extend into the windows 36 are also preferably abutting on the flanges 40 of the side cores 14, 16. The greater thickness of the blade 10 provided by the side cores 14, 16 with the middle core 12 and the larger area of securement of the inner cutting segments 32, 34 with the side cores 14, 16 provided by the lands 28 plus the flanges 40 provide the blade 10 with improved strength and structural integrity.

Figure 14:
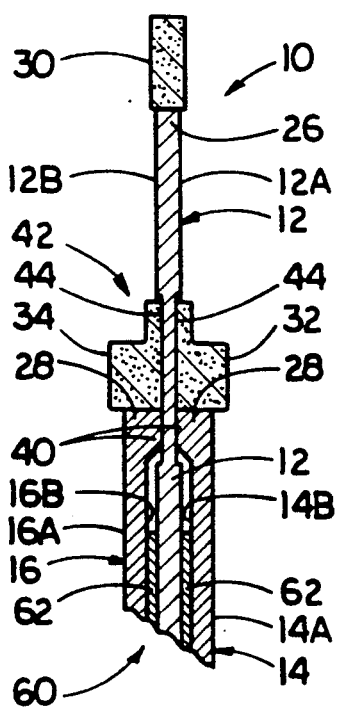
FIG. 14 is an enlarged fragmentary sectional view similar to FIG. 7 but of yet another modified embodiment of the blade.
Figure 15:
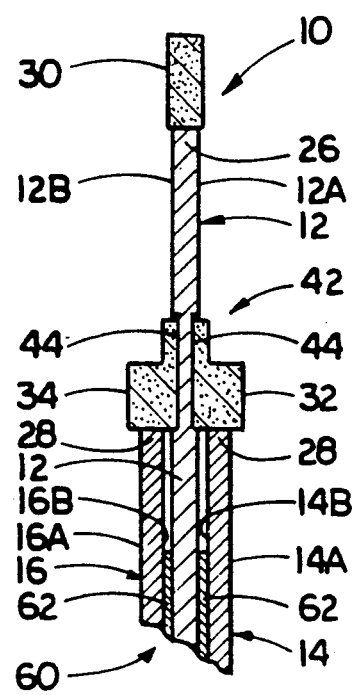
FIG. 15 is an enlarged fragmentary sectional view similar to FIG. 7 but of still another modified embodiment of the blade.

In an alternative embodiment of the saw blade 10 being shown in FIGS. 14 and 15, the side core interlocking means 42 includes a plurality of recesses 44, in place of the windows 36, defined in the opposite surfaces 12A, 12B of the middle core 12 adjacent to and extending radially outwardly from the respective lands 28 of the side cores 14, 16. The flanges 40 on the lands 28 of the right and left side cores 14, 16 project therefrom beyond surfaces 14B, 16B of the side cores 14, 16 which face toward the middle core 12 such that the flanges 40 extend into the recesses 44 of the middle core 12 toward one another. The inner cutting segments 32, 34 secured on the lands 28 of the side cores 14, 16 are also secured on the flanges 40 of the side cores and project into the recesses 44 of the middle core 12. Thus, the flanges 40 and inner cutting segments 32, 34 of the side cores 14, 16 are spaced from one another by the thickness of the middle core 12 between the recesses 44 thereof.

Referring to FIGS. 1, 3, 5 and 11, the saw blade 10 further includes inner anti-undercut means 46 on the middle core 12 and right and left side cores 14, 16 at predetermined locations thereon between the center C of the blade and periphery 22 of the middle core 12 and between preselected ones of the lands 28 of the side cores 14, 16. The inner anti-undercut means 46 defines first exit paths away from the inner cutting segments 32, 24 for flow of material particles (swarf) generated from cutting of the groove and flushing of the groove by fluid coolant. Providing the paths for exiting of the material particles minimizes the dwell time of the swarf within the groove and thereby minimizes engagement of the swarf with the side cores 14, 16 adjacent to and radially inwardly from the inner cutting segments 32, 34, resulting in reduction of wear and undercutting of the side cores 14, 16 at these locations.

More particularly, the inner anti-undercut means 46 includes a plurality of openings 48 defined in the middle core 12 at the predetermined locations and a plurality of filler segments 50 disposed in the openings 48 and secured to the middle core 12, such as by the same methods of securement used to attach the outer and inner cutting segments 30, 32, 34, 24 respectively to the sectors 26 and lands 28. The inner anti-undercut means 46 also includes a plurality of cutouts 52 defined in each side core 14, 16 at the predetermined locations thereon between the preselected ones of the lands 28 of the side cores. The openings 48 and filler segments 50 of the middle core 12 and the cutouts 52 of the each side core 14, 16 are less in number than the lands 28 of each side core 14, 16 and the inner cutting segments 32, 34 on the side cores 14, 16. Preferably, four openings 48 and filler segments 50 are employed, whereas sixteen lands 28 and inner cutting segments 32, 34 are provided one each side core 14, 16. Each filler segment 50 has a width greater than the thickness of the middle core 12 adjacent thereto and less than the width of each inner cutting segment 32, 34 such that the filler segments 50 extend beyond the opposite surfaces of the core through an extent less than that through which the inner cutting segments 32, 34 extend beyond the opposite surfaces of the side cores 14, 16.

Figure 3:
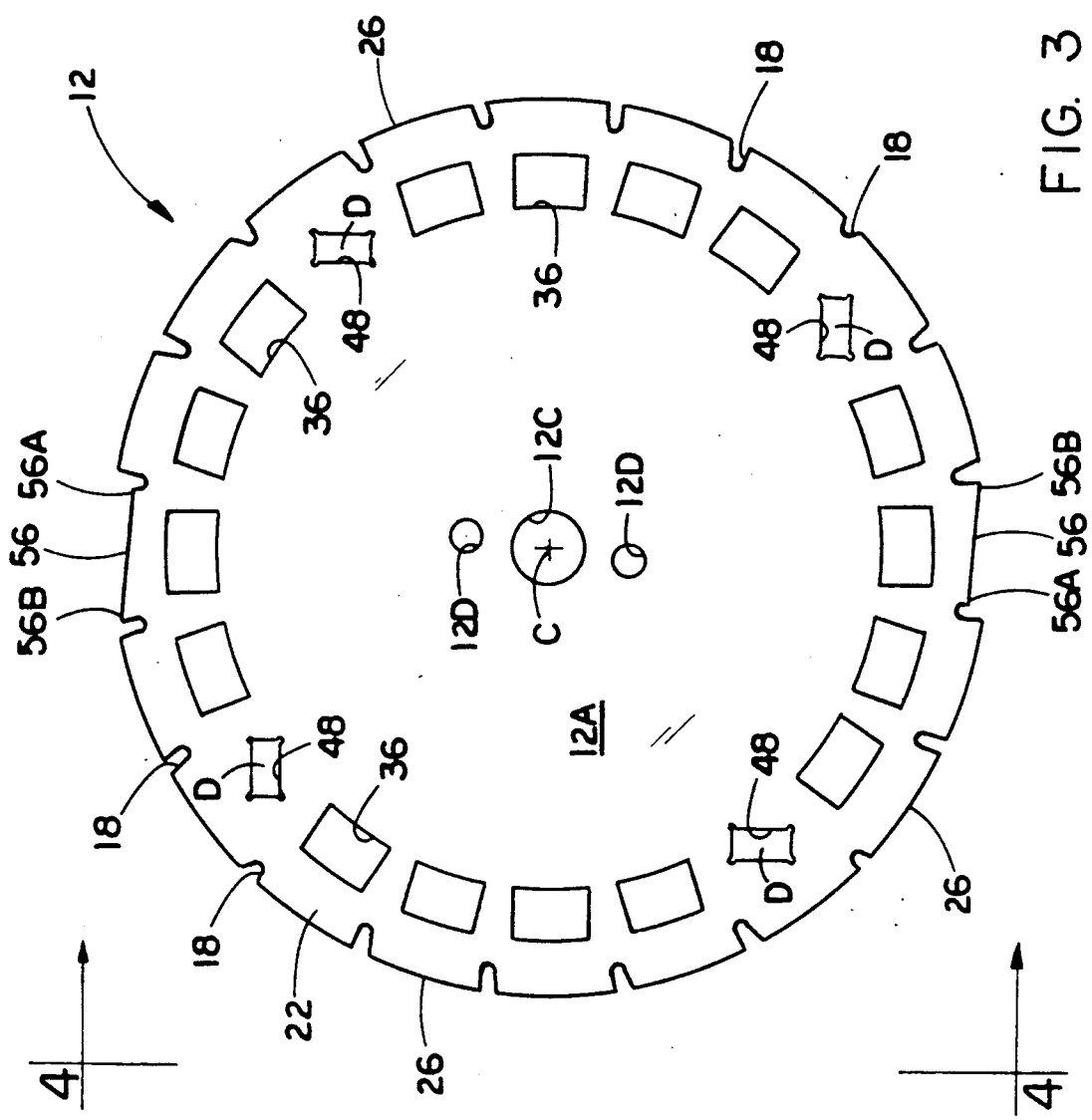
FIG. 3 is a side elevational view of a middle core of the blade of FIG. 1.
Figure 4:
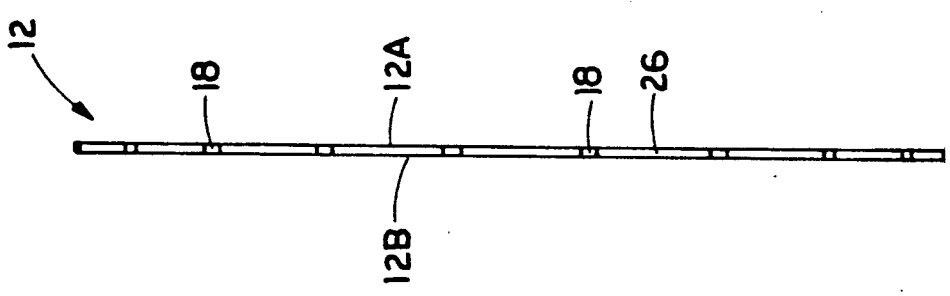
FIG. 4 is an end elevational view of the middle core as seen along line 4—4 of FIG. 3.
Figure 5:
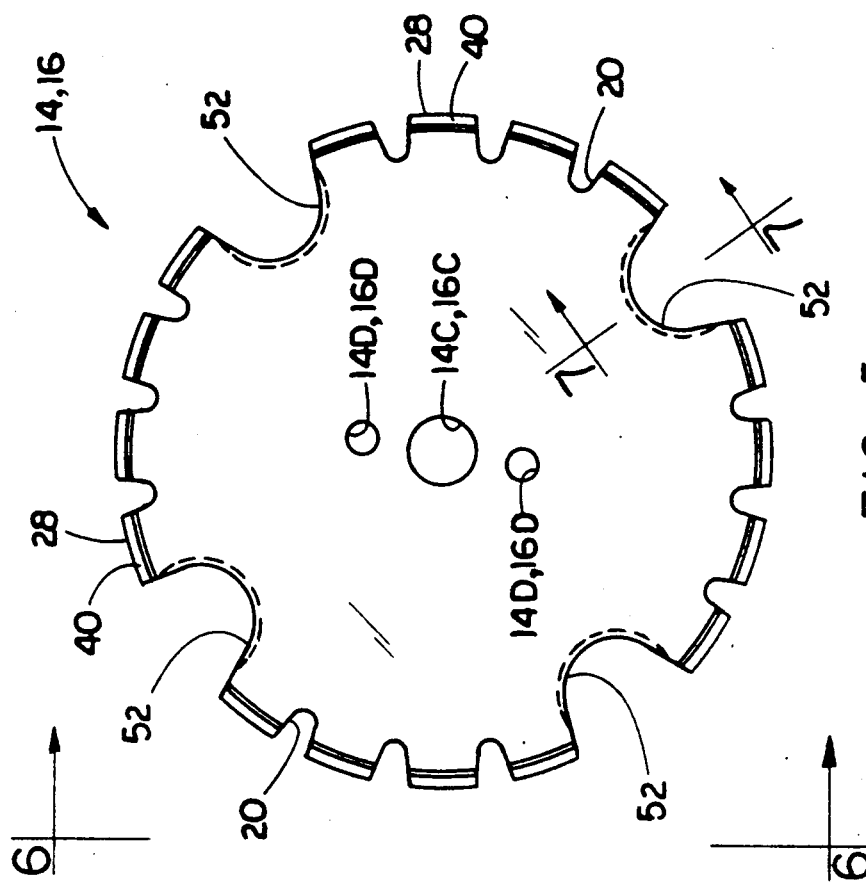
FIG. 5 is a side elevational view of one of a pair of side cores of the blade of FIG. 1.
Figure 7:
FIG. 7 is an enlarged fragmentary sectional view of the side core taken along line 7—7 of FIG. 5.
Figure 6:
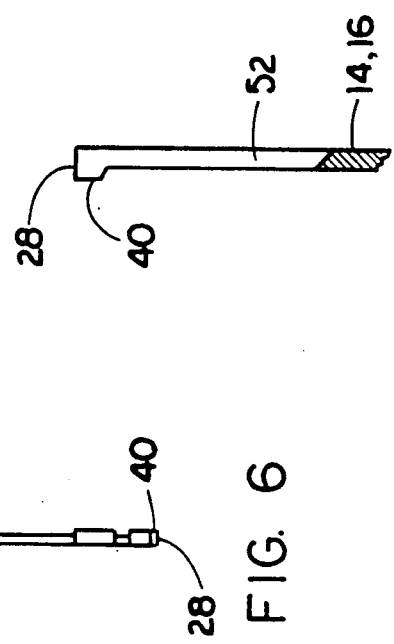
FIG. 6 is an end elevational view of the side core as seen along line 6—6 of FIG. 5.
Figure 16:
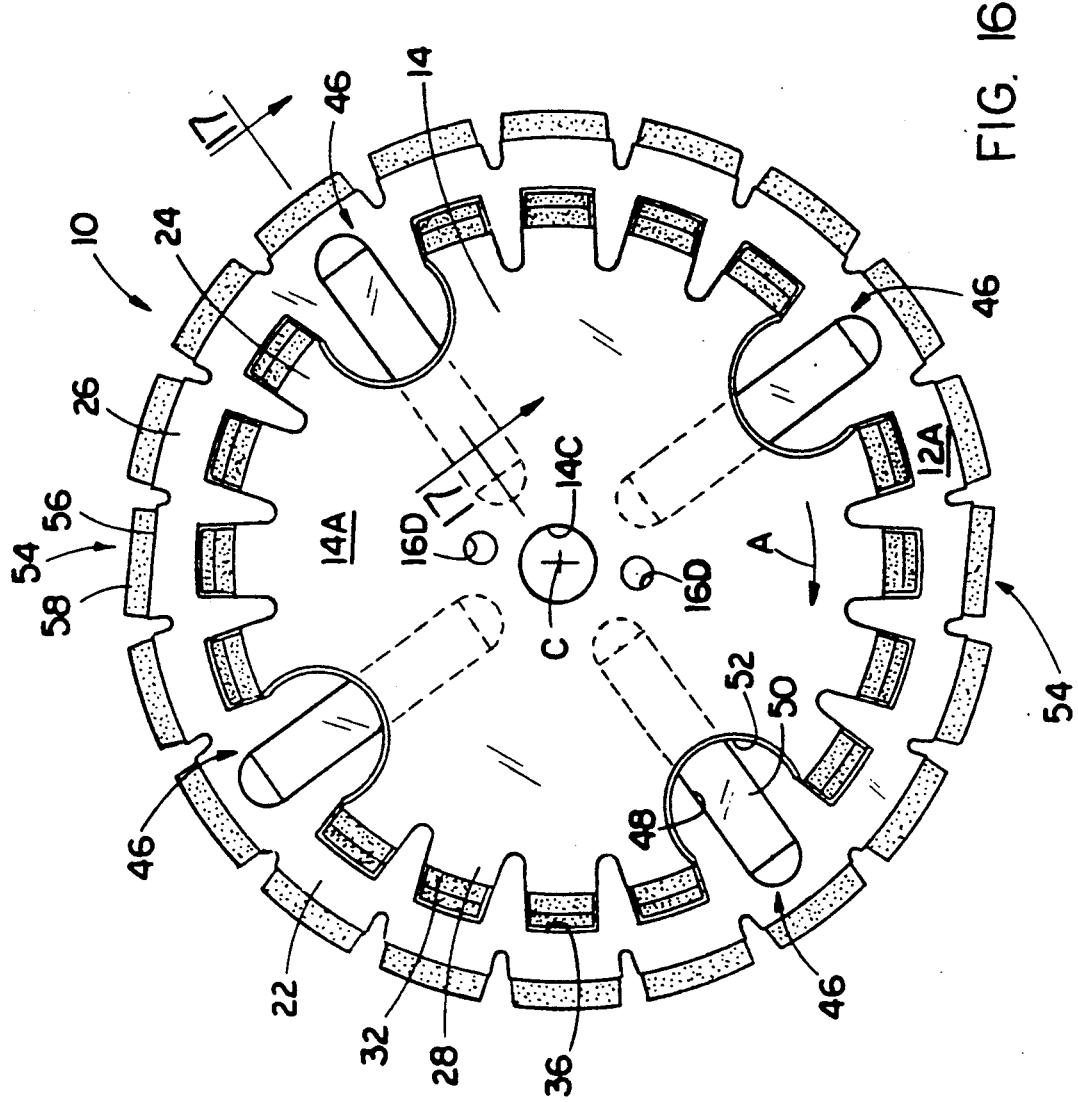
FIG. 16 is a side elevational view similar to FIG. 1 but of a further modified embodiment of the blade.
Figure 17:
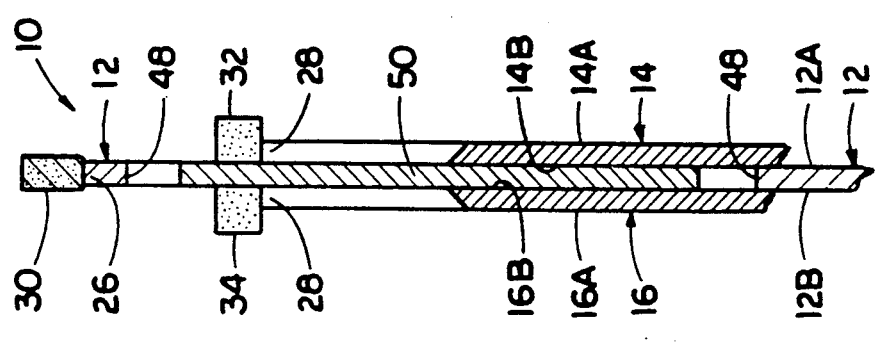
FIG. 17 is an enlarged fragmentary sectional view of the blade taken along line 17—17 of FIG. 16.

Further, each opening 48 of the inner means 46 is located on the middle core 12 such that a center D of the opening 48 lies on a circle generated about the center C of the blade 10 by a radius extending from the center C of the blade to an outer cutting edge of each inner cutting segment 32, 34. Also, as depicted in FIGS. 1 and 3, each opening 48 has a rectangular configuration and length and width dimensions extending substantially parallel to respective orthogonal axes which extend through the center C of the blade 10. Alternatively, as depicted in FIG. 16, each opening 48 can be substantially oblong in configuration and have a length dimension extending substantially radially relative to the center C of the blade 10.

The blade 10 also includes outer anti-undercut means 54 on the middle core 12 at predetermined places along the periphery 22 thereof and between preselected ones of the sectors 26 thereof for defining second exit paths away from the outer cutting segments 30 for flow of material particles generated from the cutting of the groove and flushing of the groove by fluid coolant. The exiting of the material particles (swarf) reduce wear and undercutting of the core 12 adjacent to the outer cutting segments 30. The outer means 54 includes at least a pair of platforms 56 defined in the middle core 12 at the predetermined places being preferably angular displaced from one another through 180°. Each platform 56 has an inclined orientation, being closer at one end 56A to the center C of the middle core 12 than at an opposite end 56B thereof. The closer end 56A is the leading end of the platform 56 relative to the intended direction of rotation of the blade 10, as denoted by the arrow A in FIG. 1. The outer anti-undercut means 54 also includes a filler segment 58 secured to each platform 56 of the middle core 12. The platforms 56 and filler segments 58 are less in number than the sectors 26 and outer cutting segments 30. By way of example, there are two platforms 56 and filler segments 58, whereas there are eighteen sectors 26 and outer cutting segments 30.

Referring to FIGS. 12-15, the saw blade 10 also can employ spacer means 60 disposed between the adjacent facing surfaces 14B, 16B of the side cores 14, 16 and the opposite surfaces 12A, 12B of the middle core 12 for positioning the side cores 14, 16 at predetermined spacings from the middle core 12. The spacer means 60 are preferably in the form of a pair of thin annular disks 62 disposed respectively between the opposite surfaces 12A, 12B of the middle core 12 and the surfaces 14B, 16B of the side cores 14, 16 facing toward the middle core 12.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A circular saw blade for cutting a two-tier groove in a concrete surface, comprising:
   (a) a substantially circular middle core having a center, a periphery and a pair of opposite surfaces, said middle core including a plurality of sectors defined in circumferentially spaced relation to one another relative to said center and along said periphery of said middle core;
   (b) a plurality of outer cutting segments secured to said respective sectors of said middle core, each said outer cutting segment having a width greater than the thickness of said middle core between said opposite surfaces thereof such that said outer cutting segments extend beyond said opposite surfaces of said middle core and are operable for cutting a first tier of a groove in a concrete surface;
   (c) a pair of substantially circular side cores, each said side core having a center, a periphery and a pair of opposite surfaces, each said side core being disposed adjacent to one of said opposite surfaces of said middle core, each said side core including a plurality of lands defined in circumferentially spaced relation to one another relative to said center and along said periphery of said side core, each said side core being smaller in diameter than said middle core such that said lands of said side cores are displaced radially inwardly from said sectors of said middle core;
   (d) a plurality of inner cutting segments secured to said respective lands of each said side core, each of said inner cutting segments on one of said side cores being aligned with one of said inner cutting segments on the other of said side cores, each pair of said aligned inner cutting segment having a width greater than the width of each said outer cutting segments and greater than the thickness of each said side core between said opposite surfaces thereof such that said inner cutting segments extend beyond said ones of said opposite surfaces of said side cores that face away from said middle core and are operable for cutting a second tier of the groove in the concrete surface being superimposed on and shallower than the first tier of the groove;
   (e) said middle core having a plurality of windows defined therethrough adjacent to and extending radially outwardly from said respective lands of said side cores, said aligned inner cutting segments on said respective side cores projecting toward one another into said windows of said middle core.

2. The blade as recited in claim 1, wherein said aligned inner cutting segments on said side cores have substantially identical L-shaped configurations in cross-section being oriented in reverse of one another.

3. The blade as recited in claim 1, wherein said aligned inner cutting segments on said side cores are abutting one another within said windows of said middle core.

4. The blade as recited in claim 1, wherein said aligned inner cutting segments on said side cores are spaced from one another within said windows of said middle core.

5. A circular saw blade for cutting a two-tier groove in a concrete surface, comprising:
   (a) a substantially circular middle core having a center, a periphery and a pair of opposite surfaces, said middle core including a plurality of sectors defined in circumferentially spaced relation to one another relative to said center and along said periphery of said middle core;
   (b) a plurality of outer cutting segments secured to said respective sectors of said middle core, each said outer cutting segment having a width greater than the thickness of said middle core between said opposite surfaces thereof such that said outer cutting segments extend beyond said opposite surfaces of said middle core and are operable for cutting a first tier of a groove in a concrete surface;
   (c) a pair of substantially circular side cores, each said side core having a center, a periphery and a pair of opposite surfaces, each said side core being disposed adjacent to one of said opposite surfaces of said middle core, each said side core including a plurality of lands defined in circumferentially spaced relation to one another relative to said center and along said periphery of said side core, each said side core being smaller in diameter than said middle core such that said lands of said side cores are displaced radially inwardly from said sectors of said middle core;
   (d) a plurality of inner cutting segments secured to said respective lands of each said side core, each of said inner cutting segments on one of said side cores being aligned with one of said inner cutting segments on the other of said side cores, each pair of said aligned inner cutting segments having a width greater than the width of each said outer cutting segments and greater than the thickness of each said side core between said opposite surfaces thereof such that said inner cutting segments extend beyond said ones of said opposite surfaces of said side cores that face away from said middle core and are operable for cutting a second tier of the groove in the concrete surface being superimposed on and shallower than the first tier of the groove;
   (e) said middle core having a plurality of recesses defined in each of said opposite surfaces thereof adjacent to and extending radially outwardly from said respective lands of said side cores, each said recess on one of said opposite surfaces of said middle core being aligned with one of said recesses on the other of said opposite surfaces of said middle core, said aligned inner cutting segments on said respective side cores projecting toward one another into said aligned recesses of said middle core.

6. The blade as recited in claim 5, wherein said aligned inner cutting segments on said side cores have substantially identical L-shaped configurations in cross-section being oriented in reverse of one another.

7. The blade as recited in claim 5, wherein said aligned inner cutting segments of said side cores are spaced from one another by the thickness of said middle core between said recesses thereof.

8. A circular saw blade for cutting a two-tier groove in a concrete surface, comprising:
   (a) a substantially circular middle core having a center, a periphery and a pair of opposite surfaces, said middle core including a plurality of sectors defined in circumferentially spaced relation to one another relative to said center and along said periphery of said middle core;
   (b) a plurality of outer cutting segments secured to said respective sectors of said middle core, each said outer cutting segment having a width greater than the thickness of said middle core between said opposite surfaces thereof such that said outer cutting segments extend beyond said opposite surfaces of said middle core and are operable for cutting a first tier of a groove in a concrete surface;
   (c) a pair of substantially circular side cores, each said side core having a center, a periphery and a pair of opposite surfaces, each said side core being disposed adjacent to one of said opposite surfaces of said middle core, each said side core including a plurality of lands defined in circumferentially spaced relation to one another relative to said center and along said periphery of said side core, each said side core being smaller in diameter than said middle core such that said lands of said side cores are displaced radially inwardly from said sectors of said middle core;
   (d) a plurality of inner cutting segments secured to said respective lands of each said side cores, each pair of said aligned inner cutting segments having a width greater than the width of each said outer cutting segments and greater than the thickness of each said side core between said opposite surfaces thereof such that said inner cutting segments extend beyond said ones of said opposite surfaces of said side cores that face away from said middle core and are operable for cutting a second tier of the groove in the concrete surface being superimposed on and shallower than the first tier of the groove; and
   (e) inner means on said middle and side cores at predetermined locations thereon between said center and periphery of said middle core and between preselected ones of said lands of said side cores for defining an exit path away from said inner cutting segments for flow of material particles generated from cutting of the groove and flushing of the groove by fluid coolant so as to reduce wear and undercutting of the core adjacent to the inner cutting segments.

9. The blade as recited in claim 8, wherein said side cores are substantially identical to one another.

10. The blade as recited in claim 8, wherein said inner means includes a plurality of openings defined in said middle core at said predetermined locations.

11. The blade as recited in claim 10, wherein each said opening of said inner means has a center which lies on a circle generated about said center of said middle core by a radius extending from said center of said middle core to a cutting edge of said inner cutting segment.

12. The blade as recited in claim 10, wherein each said opening is rectangular in configuration and has length and width dimensions extending substantially parallel to respective orthogonal axes which extend through said center of said middle core.

13. The blade as recited in claim 10, wherein each said opening is substantially oblong in configuration and has a length dimension extending substantially radially relative to said center of said middle core.

14. The blade as recited in claim 10, wherein said inner means also includes a plurality of filler segments disposed in said openings and secured to portions of said middle core adjacent to said openings.

15. The blade as recited in claim 14, wherein said inner means further includes a plurality of cutouts defined in each side core at said predetermined locations thereon between said preselected ones of said lands of said side cores.

16. The blade as recited in claim 15, wherein said openings and said filler segments of said middle core and said cutouts of each said side core are less in number than said lands of each said side core and said inner cutting segments on each said side core.

17. The blade as recited in claim 14, wherein each said filler segment has a width greater than the thickness of said middle core adjacent thereto and less than the width of each said inner cutting segment such that said filler segments extend beyond said opposite surfaces of said middle core through an extent less than that through which said inner cutting segment extends beyond said opposite surfaces of said middle and side cores.

18. A circular saw blade for cutting a two-tier groove in a concrete surface, comprising:
   (a) a substantially circular middle core having a center, a periphery and a pair of opposite surfaces, said middle core including a plurality of sectors defined in circumferentially spaced relation to one another relative to said center and along said periphery of said middle core;
   (b) a plurality of outer cutting segments secured to said respective sectors of said middle core, each said outer cutting segment having a width greater than the thickness of said middle core between said opposite surfaces thereof such that said outer cutting segments extend beyond said opposite surfaces of said middle core and are operable for cutting a first tier of a groove in a concrete surface;
   (c) a pair of substantially circular side cores, each said side core having a center, a periphery and a pair of opposite surfaces, each said side core being disposed adjacent to one of said opposite surfaces of said middle core, each said side core including a plurality of lands defined in circumferentially spaced relation to one another relative to said center and along said periphery of said side core, each said side core being smaller in diameter than said middle core such that said lands of said side cores are displaced radially inwardly from said sectors of said middle core;
   (d) a plurality of inner cutting segments secured to said respective lands of each said side core, each pair of said aligned inner cutting segments having a width greater than the width of each said outer cutting segments and greater than the thickness of each said side core between said opposite surfaces thereof such that said inner cutting segments extend beyond said ones of said opposite surfaces of said side cores that face away from said middle core and are operable for cutting a second tier of the groove in the concrete surface being superimposed on and shallower than the first tier of the groove; and (e) means for interlocking said side cores with said middle core at locations about said peripheries of said side cores.

19. The blade as recited in claim 18, wherein each of said inner cutting segments on one of said side cores is aligned with one of said inner cutting segments on the other of said side cores, said aligned inner cutting segments on said side cores have substantially identical L-shaped configurations in cross-section being oriented in reverse of one another.

20. The blade as recited in claim 18, wherein said side cores are substantially identical to one another.

21. The blade as recited in claim 18, wherein said interlocking means includes a plurality of windows defined through said middle core adjacent to and extending radially outwardly from said respective lands of said side cores.

22. The blade as recited in claim 21, wherein said interlocking means also includes a plurality of flanges on said lands of each of said side cores, said flanges on said side cores projecting from said lands beyond ones of said opposite surfaces of said side cores that face toward said middle core such that said flanges extend into said windows of said middle core toward one another within said windows of said middle core.

23. The blades as recited in claim 22, wherein said flanges are abutting one another within said windows of said middle core.

24. The blades as recited in claim 22, wherein said flanges are spaced from one another within said windows of said middle core.

25. The blade as recited in claim 22, wherein said inner cutting segments secured on said lands of said side cores are also secured on said flanges of said side cores and project into said windows of said middle core.

26. The blade as recited in claim 25, wherein said inner cutting segments of one of said side cores abuts said inner cutting segments of the other of said side cores within said windows of said middle core.

27. The blade as recited in claim 25, wherein said inner cutting segments of one of said side cores are spaced from said inner cutting segments of the other of said side cores within said windows of said middle core.

28. The blade as recited in claim 18, wherein said interlocking means includes a plurality of recesses defined in each of said opposite surfaces of said middle core adjacent to and extending radially outwardly from said respective lands of said side cores.

29. The blade as recited in claim 28, wherein said interlocking means also includes a plurality of flanges on said lands of each of said side cores, said flanges projecting from said lands beyond ones of said opposite surfaces of said side cores that face toward said middle core such that said flanges extend into said recesses of said middle core toward one another.

30. The blade as recited in claim 29, wherein said inner cutting segments secured on said lands of said side cores are also secured on said flanges of said side cores and project into said recesses of said middle core.

31. The blade as recited in claim 29, wherein said inner cutting segments of one of said side cores are spaced from said inner cutting segments of the other of said side cores by the thickness of said middle core between said recesses thereof.

32. A circular saw blade for cutting a two-tier groove in a concrete surface, comprising:

(a) a substantially circular middle core having a center, a periphery and a pair of opposite surfaces, said middle core including a plurality of sectors defined in circumferentially spaced relation to one another relative to said center and along said periphery of said middle core;

(b) a plurality of outer cutting segments secured to said respective sectors of said middle core, each said outer cutting segment having a width greater than the thickness of said middle core between said opposite surfaces thereof such that said outer cutting segments extend beyond said opposite surfaces of said middle core and are operable for cutting a first tier of a groove in a concrete surface;

(c) a pair of substantially circular side cores, each said side core having a center, a periphery and a pair of opposite surfaces, each said side core being disposed adjacent to one of said opposite surfaces of said middle core with said center of each said side core coaxially aligned with said center of said middle core, each said side core including a plurality of lands defined in circumferentially spaced relation to one another relative to said center and along said periphery of said side core, each said side core being smaller in diameter than said middle core such that said lands of said side cores are displaced radially inwardly from said sectors of said middle core;

(d) a plurality of inner cutting segments secured to said respective lands of each said side cores, each pair of said aligned inner cutting segments having a width greater than the width of each said outer cutting segments and greater than the thickness of each said side core between said opposite surfaces thereof such that said inner cutting segments extend beyond said ones of said opposite surfaces of said side cores that face away from said middle core and are operable for cutting a second tier of the groove in the concrete surface being superimposed on and shallower than the first tier of the groove; and (e) spacer means disposed between said side cores and said middle core for positioning said side cores at predetermined spacings from said middle core.

33. The blade as recited in claim 32, wherein said side cores are substantially identical to one another.

34. The blade as recited in claim 32, wherein said spacer means includes a pair of annular disks disposed respectively between said opposite surfaces of said middle core and ones of said surfaces of said side cores facing toward said middle core.

* * * * *